July 1, 1924.

F. W. ERICKSON 1,499,814

MACHINE FOR SAWING METAL ARTICLES

Filed June 23, 1922

INVENTOR_
FREDERIC W. ERICKSON
BY
*[signature]*
ATTORNEY_

Patented July 1, 1924.

1,499,814

UNITED STATES PATENT OFFICE.

FREDERIC W. ERICKSON, OF LARCHMONT, NEW YORK.

MACHINE FOR SAWING METAL ARTICLES.

Application filed June 23, 1922. Serial No. 570,458.

*To all whom it may concern:*

Be it known that I, FREDERIC W. ERICKSON, a citizen of the United States, and resident of Larchmont, in the county of Westchester and State of New York, have invented certain new and useful Improvements in Machines for Sawing Metal Articles, of which the following is a specification.

This invention relates to metal cutting machinery and has particular reference to the sawing of pipes or conduits, especially such as are used in the installation of electric wiring. I do not, however, limit myself to the use of the machine or appliance for that specific purpose.

In two former applications filed by me June 28, 1921, Serial No. 480,982, and August 18, 1921, Serial No. 493,305, I have explained that prior to the inventions set forth therein, it was customary to cut iron pipes either by a hack saw, a wheel hand cutter, or by rotating the pipe in a lathe and using a cutting-off tool. The latter is a cumbersome and slow method. A wheel cutter leaves the pipe deformed, and with its exterior diameter enlarged and its interior diameter decreased, so that it is not suitable for use where the pipes are to be joined without restriction at the joints. And pipes so cut are not suitable for use in installing a conduit for electric wiring because, for such purposes, the joined pipes must have a smooth and continuous passageway for the proper drawing in of the wires. Therefore the most commonly practiced method is to employ a hand-operated hack saw. The well-known power operated hack saws leave a burr on the inside of the pipe for a portion thereof and a burr on the outside opposite the inside burr. While satisfactory work can be produced by a hand-operated hack saw, rotating the pipe while doing so, it is a slow method because the sawing is necessarily intermittent, and an expensive method on account of the high cost of labor.

The object of my present invention is to provide a machine which is less expensive to construct than those described in the former applications above referred to, and I accomplish said object by employing a wheel having straight blade hack saws bent around the periphery of the wheel and secured thereto so that the blades project parallel with the axis of the wheel.

With the above and certain other objects in view, the advantages of which will be explained hereinafter, my invention consists in the construction and combination of parts substantially as hereinafter described and claimed.

Of the accompanying drawings which illustrate my improved machine or appliance in one of its embodiments:—

Similar reference characters indicate similar parts in all of the views.

Figure 5:
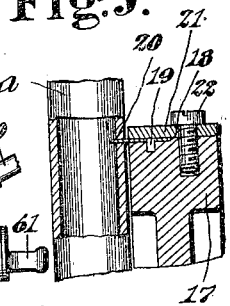
Figure 5 is a detail sectional view on line 5—5 of Figure 2, on a larger scale, and omitting the work vise structure.

The frame or support for the operative parts of the machine may comprise a suitable base block 12, a bench member 13 secured thereon, and a plate 14 secured to or integral with the member 13, said plate having bearings 15 for the shaft 16.

Secured to one end of the shaft is a wheel 17 having a cylindrical periphery a portion of which is slightly reduced to provide an annular shoulder 18 (Fig. 5). Projecting slightly from the lower or reduced peripheral portion of the wheel are dowel pins 19 at proper distances from each other around the wheel to enter holes in the ends of the saw blades 20 which are, preferably, of the type known as commercial hack saw blades. Said blades are curved longitudinally to correspond with the periphery of the wheel and are held in this bent condition by segmental clamp strips 21 secured by set screws 22.

While the saw blades which I preferably employ are of the type known as commercial hack saw blades, they differ therefrom in respect to the exact location of the holes near the ends by which they are usually secured in taut condition. The holes in the ordinary hack saw blades are practically at the exact mid-width thereof. My improved blades, for use in the machine illustrated, have their holes for the dowel pins 19 at a substantial distance to the rear of the mid-width of the blade, as indicated in Figure 5. This enables the blades to be firmly secured in position and yet project amply beyond the side face of the wheel to do the work as hereinafter described.

I will now describe the means for supporting the pipe or conduit so that it can be rotated while being cut:—

Figure 1:
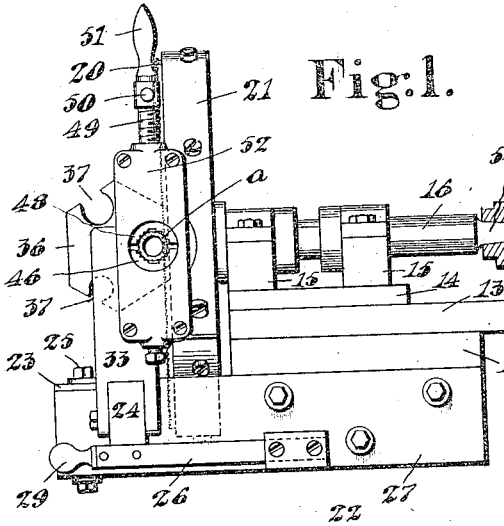
Figure 1 is a side elevation, partly broken out, of the complete machine.
Figure 3:
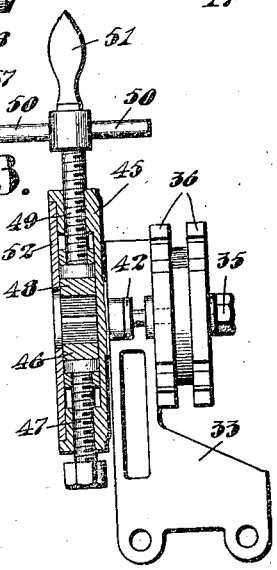
Figure 3 is a sectional elevation of the parts at the right in Figure 2, looking in the opposite direction from that indicated in said Figure 2.
Figure 2:
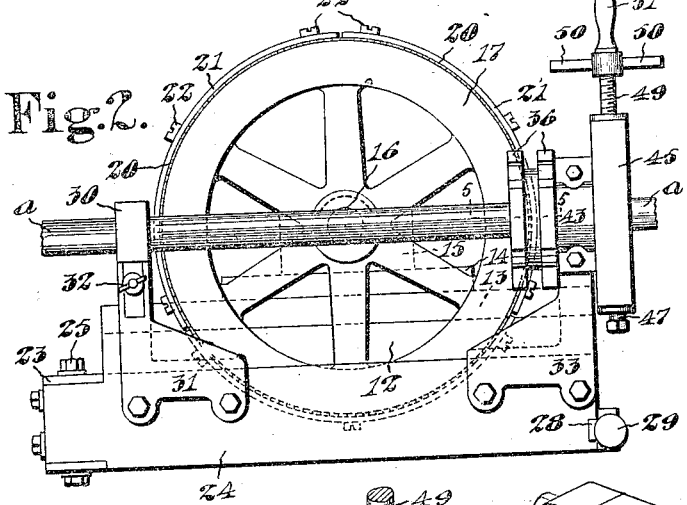
Figure 2 is an elevation looking from the left of Figure 1.

To a suitable arm or projection 23 of the base 12 a swinging arm 24 is pivoted by a hinge bolt 25 (Figs. 1 and 2). Said arm is held in its inner or operative position by a spring catch comprising a leaf spring 26 secured at one end to a strip 27 attached to one side of the base 12 and having at its other end a catch lug 28 and a handle 29.

Figure 4:
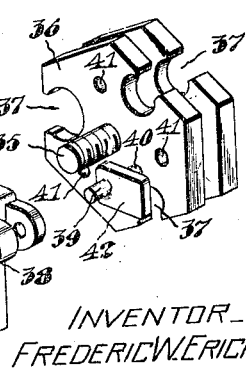
Figure 4 is a perspective view of the parts shown in Figure 3, said parts being separated from each other.

The work to be operated on, such as a pipe or conduit $a$, is supported by the swinging arm 24 diametrically past the side face of the saw wheel. It is, of course, essential that it shall be cut at but one point of its length. The point of cutting is at the right in Figure 2. At the left, near the hinge 25, the swinging arm is provided with a work rest 30, preferably open-top, connected to a bracket 31 of the arm 24 by a vertically adjustable lap joint 32. Secured to the swinging arm at or near its other end is bracket 33. The details of the mechanism carried by the bracket 33 are best illustrated by Figure 4 wherein the upper portion of said bracket is shown as having a threaded hole 34 for a stud or bolt 35 on which a hexagonal block 36 is rotatively mounted. Said block is formed or provided with openings or recesses 37 of different sizes to accommodate different diameters of pipes or other pieces of work, and it is held in proper rotative position by suitable locking means such as a bolt 40 adapted to engage either one of a series of holes 41 in the side of the hexagonal block, said bolt having a finger piece 42. Projecting from the other side of the finger piece is a pin 39 slidably mounted in a bearing 38 formed in the upper end of the bracket 33.

Formed partly in the upper end of the bracket 33 and partly in a block 43 bolted thereto, is a bearing for the hub 44 of a box or casing 45 in which are mounted two jaws 46, 48. The jaw 46 is adjusted by a bolt 47 passing through one end of the box and the jaw 48, which will be referred to as the clamping jaw, is actuated by a longer bolt or screw 49 passing through the other end of the box and having arms 50 for turning it to cause the jaw 48 to firmly clamp a pipe or conduit resting on the jaw 46. Said bolt or screw 49 also has a handle 51. The cover plate of the box 45 is indicated at 52 and it has an aperture 53 for the pipe or conduit which is being sawed.

To reduce expense, I construct the machine so that it may be driven by a motor which, when no sawing is being done, can be utilized for other purposes such as drilling. To this end, the outer end of the shaft 16 (see Figure 1) is tapered at 54 and flattened at 55, or otherwise suitably formed, to be engaged by a correspondingly formed socket such as the well-known Morse taper socket driven by an electric motor 56 of a well-known portable type. Said motor has a stud 57 passing through a hole or slot 58 in the bench member 13 which is extended for this purpose, a wing nut 59 holding it firmly in position. The cable for the conducting wires is indicated at 60, and the handle by which the motor may be placed in position or utilized for other purposes is indicated at 61.

Assuming that the article to be sawed is a metal conduit pipe as indicated at $a$, the arm 24 is swung out and the pipe is pushed between the jaws 46, 48, while they are separated the necessary distance, and through the hollow hub 44 and one of the recesses 37, and onto the rest 30, to such distance as required for the length to be cut off. The rest 30 is so mounted on the swinging arm that at no time will the pipe be touched by the saw adjacent said rest. In other words, the rest 30 will so support the pipe as to hold it clear from contact with the saw at the opposite side from where the cutting off is accomplished, which cutting off is accomplished opposite the hexagonal block 36 after the arm 24 is swung back. After location of the pipe longitudinally according to the length to be cut off, the screw 49 is actuated to cause the jaw 48 to firmly clamp the pipe against the previously adjusted jaw 46. Then the arm 24 is swung back to the position indicated by Figure 1, the operator pressing it back until the saw has cut through the wall of the pipe, at which time the arm reaches a position where the spring catch engages and locks it. Then the operator, by means of the handle 51 or otherwise, rotates the vise jaws 46, 48 which are in the box 45, until the pipe is completely cut off. During this rotation the spring catch holds the swinging arm in operative position so that all the operator has to do is to turn the pipe. This is due to the fact that the saw blades project far enough beyond the side of the wheel to cut through the wall cleanly. The blades, which are very thin, are greatly strengthened by their mounting as illustrated. Being flexed longitudinally and gripped throughout their lengths between the periphery of the wheel and the segmental clamps 21, the blades are so braced laterally that each will do its work with no lateral flexure. And since no blade contacts with the work except when moving in the cutting direction, each blade is used to its best advantage.

Owing to the fact that a multiplicity of hack saw blades are employed, said blades being arranged to act successively and each one acting during only a small fraction of the rotation of the entire series, each tooth of each blade is able to do its cutting work at maximum speed and during minimum time without heating to a degree that will be detrimental to its operative life. During the greater part of the time of rotation of the wheel the teeth are travelling in free air so as to entirely dissipate the heat caused by the work done by the teeth passing the pipe held in the vise.

Although each tooth moves in the path of the arc of a circle when cutting, there is no serious friction between the sides of the teeth and the work because the arc is so small at the point of cut off that the difference between the arc and a chord of the circle is negligible and can be taken up in the "set" of the hack saw teeth.

While I have referred to the cutting element of the machine as preferably comprising a series of members of the commercial hack saw type, I do not limit myself thereto for all purposes, since blades longer than that type might be employed, or a single blade long enough to extend around the periphery of the wheel may be clamped thereon. One objection to such long blade however is that an injury to any part of it would usually necessitate its complete discard, while an injury to a blade of the hack saw type can be repaired by simply substituting a relatively inexpensive member.

Having now described my invention, I claim:—

1. A sawing machine comprising a rotary circular series of straight-edge saw blades, and means for rotatively supporting a pipe extending transversely of the axis of rotation of the saw blades.

2. A sawing machine comprising a wheel provided with a circular series of teeth projecting from the side face thereof, and means for rotatively supporting a pipe extending transversely of the axis of rotation of said teeth.

3. A metal cutting machine comprising a wheel, a series of straight-edge saw blades carried thereby and having their teeth projecting from the side face thereof, and a movable rotatable work holder adjacent the side face of the wheel, said holder being mounted to support work extending transversely of the axis of rotation of the wheel.

4. A pipe cutting machine comprising a rotatable pipe holder and a rotary saw blade mounted to rotate in a plane perpendicular to the axis of the pipe, said holder being mounted to support the pipe transversely of the axis of rotation of the saw blade.

5. A sawing machine comprising a wheel provided with a circular series of teeth projecting from the side face thereof, a pivoted arm mounted to swing on a vertical axis toward and from said side face of the wheel, and means carried by said arm for rotatively supporting an article to be operated upon by said teeth.

6. A sawing machine comprising a wheel provided with a circular series of teeth projecting from the side face thereof, a pivoted arm mounted to swing toward and from said side face of the wheel, and a rotatable work vise carried by said arm.

7. A sawing machine comprising a wheel provided with a circular series of teeth projecting from the side face thereof, a pivoted arm mounted to swing toward and from the said side face of the wheel, a rotatable work vise carried by said arm, and means for holding said arm and the work carried thereby in predetermined position relatively to the wheel while the vise is rotated.

8. A sawing machine comprising a wheel provided with a circular series of teeth projecting from the side face thereof, a pivoted arm adjacent said side face of the wheel, a work rest and a work vise carried by said arm, and means for securing the said arm in operative position relatively to the wheel.

In testimony whereof I have affixed my signature.

FREDERIC W. ERICKSON.

Witnesses:
  LEILA H. ERICKSON,
  O. H. MORHAUS.